4245X
Sheet 1 - 2 Sheets.
I. Clowes,
Oil Press,
Patented Nov. 3, 1825.
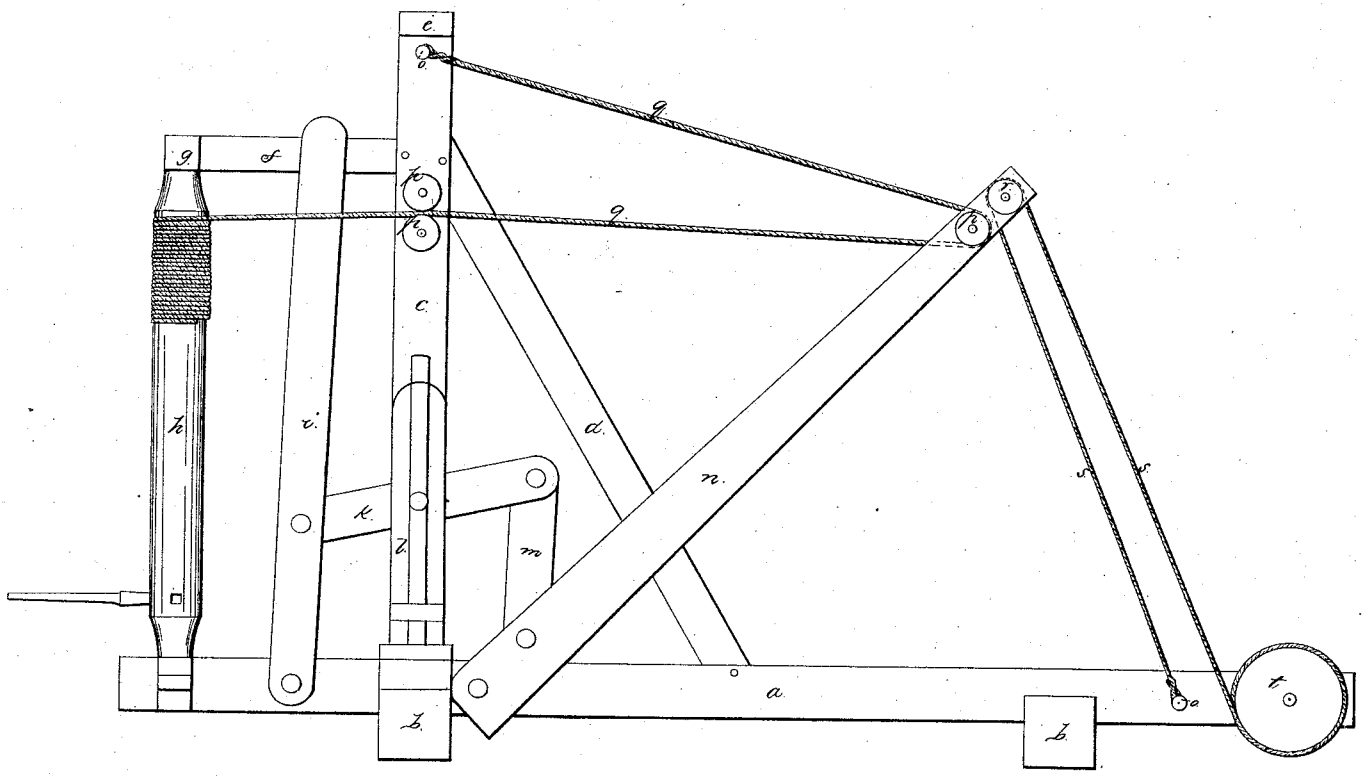
AM. PHOTO-LITHO. CO. N.Y. (OSBORNE'S PROCESS)

4245X
Sheet 2 - 2 Sheets.
I. Clowes,
Oil Press,
Patented Nov. 3, 1825.
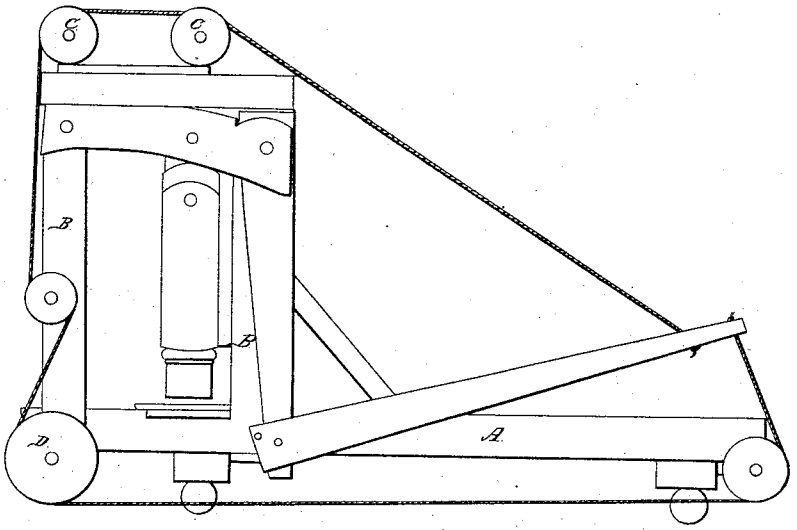
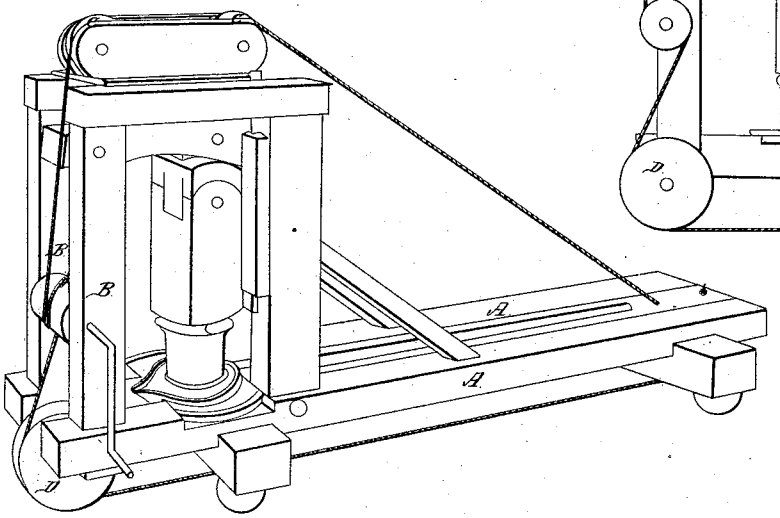
AM. PHOTO-LITHO. CO. N.Y. (OSBORNE'S PROCESS)

United States Patent Office

PTO - BOYERS, PA Duty Station

MISSING PAGE TEMPORARY NOTICE

PATENT # 4245X FOR ISSUE DATE 11-3-1825

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text

Data Conversion Operation

Boyers, Pa